(12) United States Patent
Toyooka et al.

(10) Patent No.: US 9,305,500 B2
(45) Date of Patent: Apr. 5, 2016

(54) PROJECTOR

(75) Inventors: Takashi Toyooka, Matsumoto (JP);
Hiroyuki Hosaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1807 days.

(21) Appl. No.: 11/812,054

(22) Filed: Jun. 14, 2007

(65) Prior Publication Data

US 2008/0007662 A1 Jan. 10, 2008

(30) Foreign Application Priority Data

Jul. 7, 2006 (JP) ................. 2006-187526

(51) Int. Cl.
*H04N 9/31* (2006.01)
*G09G 3/36* (2006.01)
*G09G 3/34* (2006.01)
*G09G 3/20* (2006.01)

(52) U.S. Cl.
CPC ............ *G09G 3/3614* (2013.01); *G09G 3/3406* (2013.01); *H04N 9/312* (2013.01); *H04N 9/3123* (2013.01); *G09G 3/2014* (2013.01); *G09G 3/3618* (2013.01); *G09G 2320/0233* (2013.01); *G09G 2320/0646* (2013.01); *H04N 9/3126* (2013.01)

(58) Field of Classification Search
CPC ... H04N 9/312; H04N 9/3123; H04N 9/3126; G09G 3/3614; G09G 3/3618; G09G 2320/0646
USPC .......... 353/85, 121, 122; 349/5, 6, 7, 8, 9, 10; 348/790, 791, 792, 793
See application file for complete search history.

(56) References Cited

U.S. PATENT DOCUMENTS

| | | | |
|---|---|---|---|
| 6,392,620 B1 * | 5/2002 | Mizutani et al. ............... 345/88 |
| 6,991,336 B2 * | 1/2006 | Matsui ................ H04N 9/315 345/36 |
| 7,080,909 B2 * | 7/2006 | Matsui ................ H04N 9/315 345/36 |
| 7,303,288 B2 * | 12/2007 | Miyazawa ............ H04N 9/315 348/750 |
| 7,316,483 B2 * | 1/2008 | Moench ............... H04N 9/3114 315/291 |
| 7,733,317 B2 * | 6/2010 | Murai ................... G09G 3/007 345/84 |
| 2002/0159039 A1 * | 10/2002 | Yoneno .......................... 353/85 |
| 2005/0007306 A1 | 1/2005 | Iisaka et al. |
| 2005/0007563 A1 * | 1/2005 | Yamazaki et al. ............. 353/98 |
| 2005/0128436 A1 * | 6/2005 | Matsui ............................ 353/31 |
| 2005/0168455 A1 * | 8/2005 | Murai ................... G09G 3/007 345/204 |
| 2006/0092346 A1 * | 5/2006 | Moon et al. ..................... 349/61 |
| 2006/0125742 A1 | 6/2006 | Sekiguchi et al. |
| 2006/0139578 A1 * | 6/2006 | Nakagawa ........... H04N 9/3114 353/85 |
| 2006/0256301 A1 * | 11/2006 | Tangen ................ H04N 9/3114 353/85 |

(Continued)

FOREIGN PATENT DOCUMENTS

JP U-03-020581 2/1991
JP A-2002-014662 1/2002

(Continued)

*Primary Examiner* — Bao-Luan Le
(74) *Attorney, Agent, or Firm* — Oliff PLC

(57) ABSTRACT

A projector includes a light source unit that supplies light, and a spatial light modulator that modulates light supplied from the light source unit according to an image signal. The spatial light modulator is driven by an applied voltage whose polarity is reversed according to a polarity-reversing frequency which is specific to the spatial light modulator. The light source unit supplies light which is modulated according to pulse width modulation for which fundamental frequency is set based on the polarity-reversing frequency.

14 Claims, 17 Drawing Sheets

(56) References Cited

U.S. PATENT DOCUMENTS

| | | | |
|---|---|---|---|
| 2006/0279709 A1* | 12/2006 | Yamamoto | G03B 21/2013 353/85 |
| 2007/0002287 A1* | 1/2007 | Matsumoto | H04N 5/74 353/85 |
| 2007/0076175 A1* | 4/2007 | Nakagawa | G09G 3/3413 353/85 |
| 2008/0137041 A1* | 6/2008 | Okamoto | H05B 41/2887 353/85 |

FOREIGN PATENT DOCUMENTS

| | | |
|---|---|---|
| JP | A-2003-330424 | 11/2003 |
| JP | A 2004-354717 | 12/2004 |
| JP | A-2006-178435 | 7/2006 |

* cited by examiner

M2  M1

PROJECTOR

CROSS-REFERENCE TO RELATED APPLICATIONS

The present document incorporates by reference the entire contents of Japanese priority document JP-A-2006-187526 filed in Japan on Jul. 7, 2006.

BACKGROUND

1. Technical Field

The present invention relates to a projector, and more particularly to a technique concerning a projector which includes a liquid crystal display as a spatial light modulator.

2. Related Art

Projectors display images by projecting light modulated according to image signals. Conventionally, techniques have been proposed for modulating the light before the light comes into a spatial light modulator of the projector, for example, in addition to modulating the light in the spatial light modulator (see JP-A-2004-354717, for example). When the incoming light to the spatial light modulator is modulated, the projector can display the image in a wider dynamic range than a dynamic range corresponding to the control of the spatial light modulator.

As a spatial light modulator, a liquid crystal display can be employed, for example. To prevent degradation of liquid crystal material called "image persistence", the polarity of an applied voltage to the liquid crystal display is reversed and the resulting alternate-current voltage with the reversed polarity is applied to drive the liquid crystal display every predetermined time period. When the polarity of the applied voltage is reversed, in other words, when the applied voltage changes its polarity from the positive to the negative, a displayed image sometimes changes its brightness slightly. Even if there is a slight change in the brightness, a viewer recognizes the image in an average brightness as far as a light source unit is constantly on, because in this case the image corresponding to the positive polarity and the image corresponding to the negative polarity are integrated without bias. On the other hand, when the ON-OFF switching of the light source unit is controlled based on Pulse Width Modulation (PWM), for example, the image may be displayed for different time periods corresponding to the positive polarity and to the negative polarity. In this case, since the images of the negative polarity and the positive polarity are not equally integrated, the change in brightness becomes recognizable, causing problems such as gradation shift and non-uniformity of display. Then, high-quality image display is difficult to achieve. As can be seen, techniques as described above have difficulties in displaying high-quality images in a wide dynamic range.

SUMMARY

An advantage of some aspects of the invention is that a projector can display high-quality images in a wide dynamic range.

A projector according to an aspect of the invention includes a light source unit that supplies light, and a spatial light modulator that modulates light supplied from the light source unit according to an image signal. The spatial light modulator is driven by an applied voltage whose polarity is reversed according to a polarity-reversing frequency which is specific to the spatial light modulator. The light source unit supplies light which is modulated according to pulse width modulation for which fundamental frequency is set based on the polarity-reversing frequency.

It is preferable that at least one of (A) the fundamental frequency is an even multiple of the polarity-reversing frequency, and (B) a phase of the pulse width modulation is reversed every polarity-reversing period according to the polarity-reversing frequency, be satisfied.

It is preferable that the phase of the pulse width modulation be reversed every time one writing of the image signal is performed for an entire screen.

It is preferable that the light source unit supply light according to a smoothed signal which is obtained by smoothing a pulse width modulation (PWM) signal.

It is preferable that there be plural light source units, and that the light source units be controlled according to difference in outputs thereof.

It is preferable that the light source unit include a solid-state light source.

It is preferable that the spatial light modulator include a liquid crystal display.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments of the invention will be described in detail below with reference to the accompanying drawings.

Figure 1:
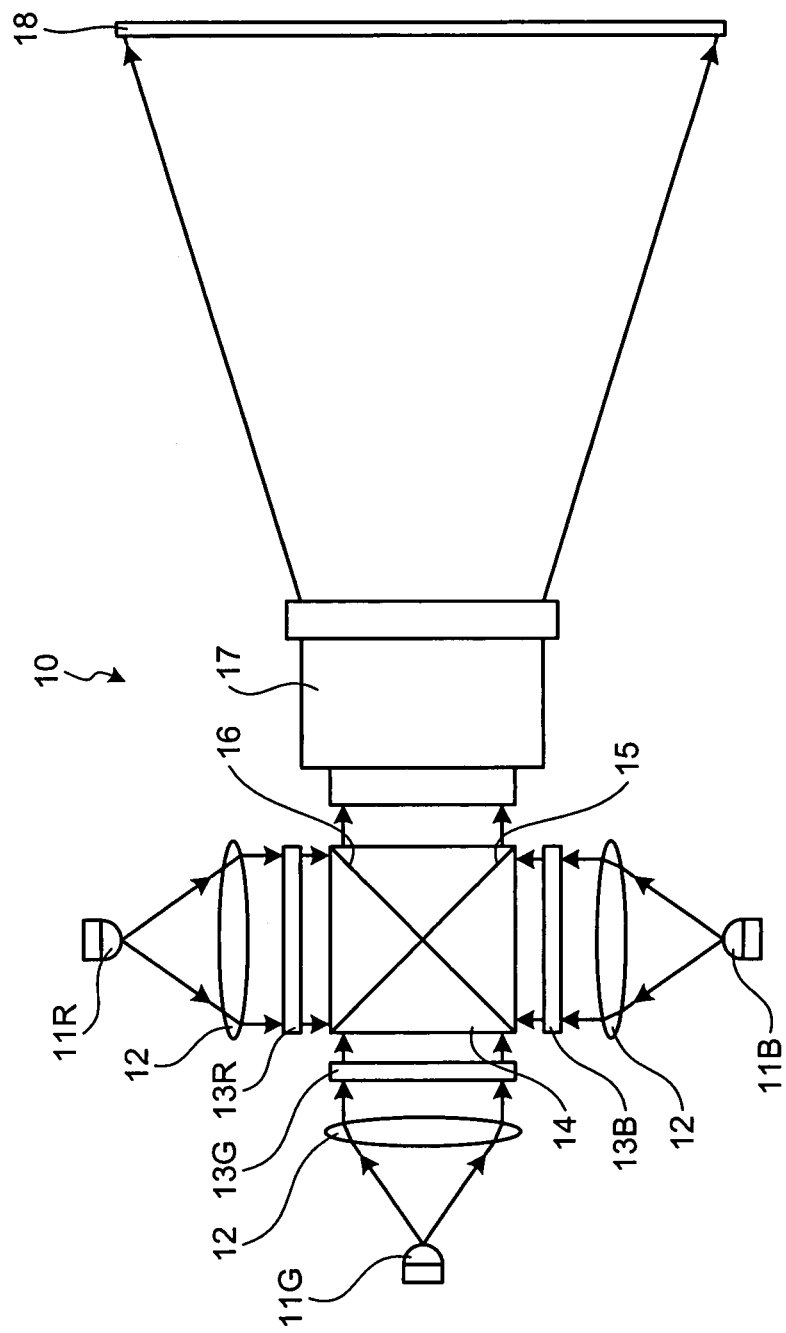
FIG. 1 is a schematic diagram of a structure of a projector according to one embodiment of the invention.

FIG. 1 is a schematic diagram of a projector 10 according to one embodiment of the invention. The projector 10 is a front projector which projects light on a screen 18 so that the viewer can observe light reflected from the screen 18 as images. A red-light (R-light) light emitting diode (LED) 11R is a solid-state light source that serves as a light source unit which supplies R-light. The R-light emitted from the R-light LED 11R is turned into parallel light in a collimator lens 12 before entering into an R-light spatial light modulator 13R. The R-light spatial light modulator 13R is a transmissive liquid crystal display which modulates the R-light according to image signals. The R-light spatial light modulator 13R emits modulated R-light which enters a cross dichroic prism 14 which serves as a color composite optical system.

A green-light (G-light) LED 11G is a solid-state light source that serves as a light source unit which supplies G-light. The G-light emitted from the G-light LED 11G is turned into parallel light in the collimator lens 12 before entering into a G-light spatial light modulator 13G. The G-light spatial light modulator 13G is a transmissive liquid crystal display which modulates the G-light according to image signals. The G-light spatial light modulator 13G emits modulated G-light which enters the cross dichroic prism 14 from a different side from a side through which the R-light enters.

A blue-light (B-light) LED 11B is a solid-state light source that serves as a light source unit which supplies B-light. The B-light emitted from the B-light LED 11B is turned into parallel light in the collimator lens 12 before entering into a B-light spatial light modulator 13B. The B-light spatial light modulator 13B is a transmissive liquid crystal display which modulates the B-light according to image signals. The B-light spatial light modulator 13B emits modulated B-light which enters the cross dichroic prism 14 from a different side from the side through which the R-light or the G-light enters. The projector 10 may include an equalizing optical system which equalizes intensity distribution of a light flux. For example, the projector 10 may include a rod integrator or a fly's eye lens.

The cross dichroic prism 14 includes two dichroic films 15 and 16 which are arranged so as to be substantially perpendicular to each other. The first dichroic film 15 reflects the R-light and transmits the G-light and the B-light. The second dichroic film 16 reflects the B-light and transmits the R-light and the G-light. The cross dichroic prism 14 combines the R-light, G-light, and B-light coming in from different sides and emits the resulting composite light in a direction of a projection lens 17. The projection lens 17 receives and projects the light combined by the cross dichroic prism 14 onto the screen 18.

Figure 2:
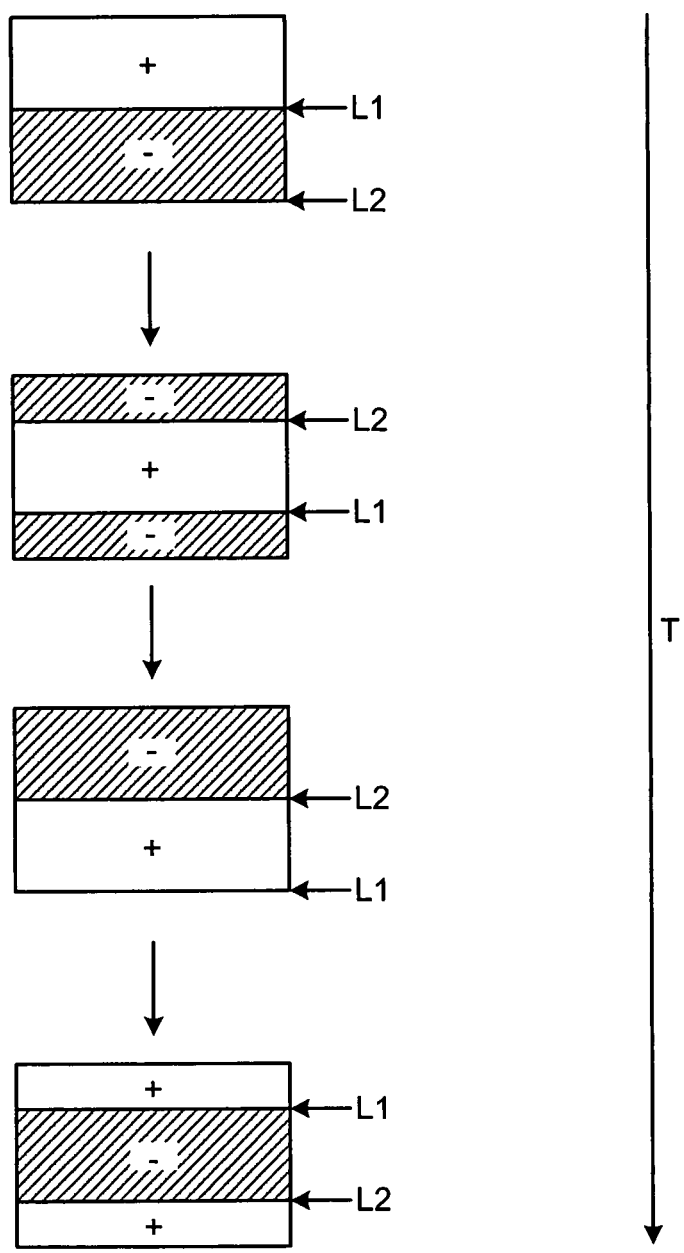
FIG. 2 is a schematic diagram illustrating a manner of driving a spatial light modulator.

FIG. 2 is a schematic diagram illustrating how the spatial light modulators 13R, 13G, and 13B, which are liquid crystal displays, are driven. When the liquid crystals are driven, if a direct-current voltage of the same polarity is applied for an extended period of time, image persistence, which is degradation of liquid crystals, occurs. To prevent the image persistence, the spatial light modulators 13R, 13G, and 13B are driven by alternate-current voltage. For example, assume that the liquid crystal display has a specific frequency of 60 Hz for reversing the polarity (hereinafter referred to as "polarity-reversing frequency"). In this case, the spatial light modulators 13R, 13G, and 13B are driven by an alternate-current voltage with a polarity-reversing period T of 1/60 second. Here, the polarity-reversing period T is a period according to which the polarity of an applied voltage is reversed. If a time period set for one-image writing is 1/60 second, i.e., the same as the polarity-reversing period T, the polarity is reversed during the one-image writing period. After a writing position L1 of positive polarity passes a pixel, the positive potential is retained in the pixel until the next writing position L2 of negative polarity comes to the pixel. After the writing position L2 of negative polarity passes the pixel, the negative potential is retained in the pixel until the next writing position L1 of positive polarity reaches the pixel.

The brightness of the image may change slightly according to the polarity of the applied voltage. However, when the LEDs 11R, 11G, and 11B are constantly on, the image of the positive polarity and the image of the negative polarity are integrated within one-image writing period without bias. Therefore, even if there is a slight difference in the brightness according to the polarity of the applied voltage, the viewer recognizes an image in the average brightness.

Figure 3:
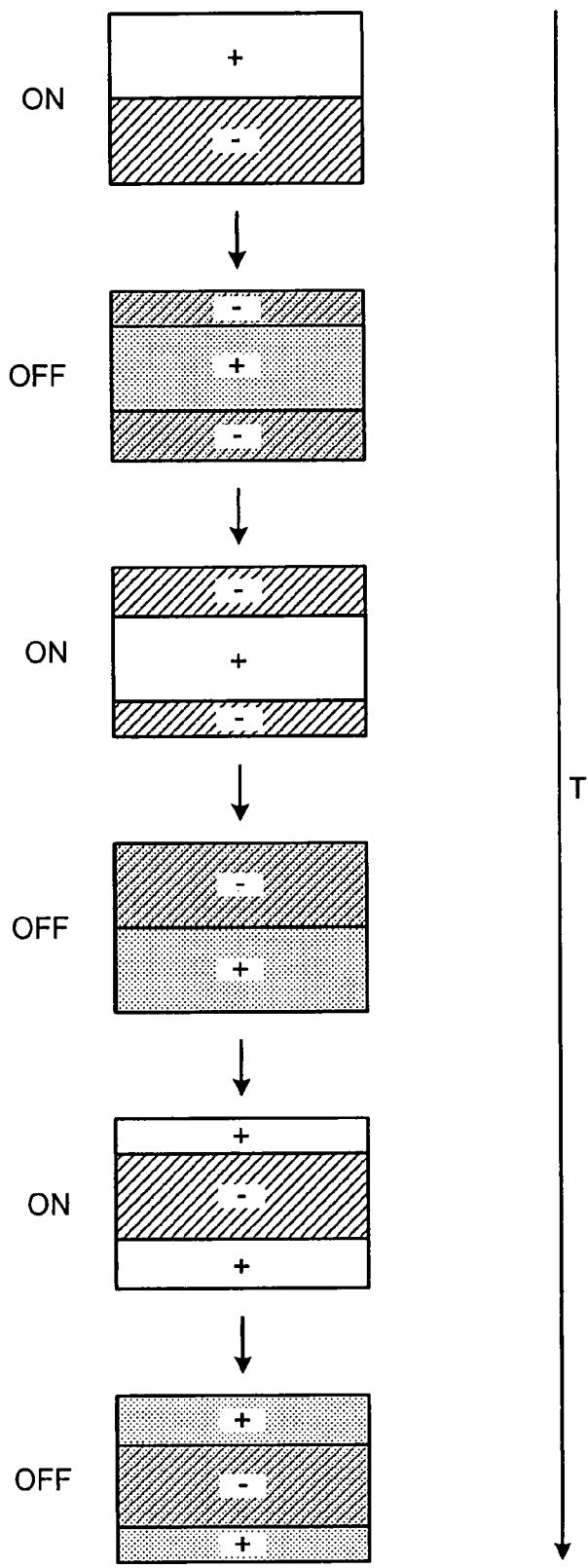
FIG. 3 is a schematic diagram illustrating an ON/OFF switching of an LED.

FIG. 3 is a schematic diagram illustrating ON/OFF switching of the LEDs 11R, 11G, and 11B based on PWM. The LEDs 11R, 11G, and 11B are controlled based on PWM. The PWM control allows for stable and easy control using a digital circuit. The viewer recognizes an integration of images displayed during the ON-time of the LEDs 11R, 11G, and 11B as an image. Therefore, if the brightness of the images are adjusted based on the ON-time of the LEDs 11R, 11G, and 11B, the images can be displayed in a wider dynamic range than the dynamic range corresponding to the control of the spatial light modulators 13R, 13G, and 13B.

Figure 4:
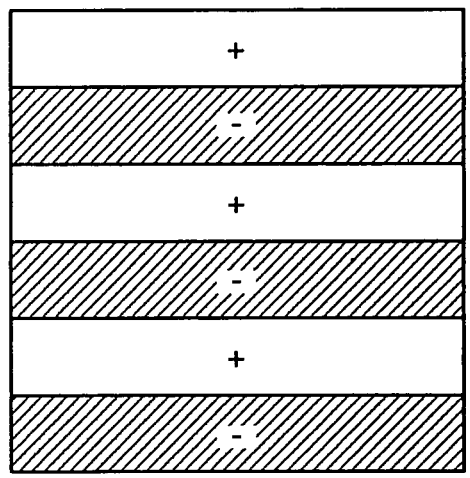
FIG. 4 is a schematic diagram illustrating non-uniformity of display.

When the ON/OFF switching of the LEDs 11R, 11G, and 11B are performed based on PWM, a time the image is displayed corresponding to the positive polarity sometimes differs from a time the image is displayed corresponding to the negative polarity. For example, assume that the LEDs 11R, 11G, and 11B are turned ON and OFF three times during the polarity-reversing period T, as shown in FIG. 3. In this case, if the images displayed during ON-time of the LEDs 11R, 11G, and 11B are integrated, brightness corresponding to the positive polarity is dominant in some portions of the resulting image, while brightness corresponding to the negative polarity is dominant in other portions, as shown in FIG. 4. As a result, three sets of a positive-polarity-dominant portion and a negative-polarity-dominant portion are displayed, and the viewer recognizes non-uniformity of display as three belt-like portions.

Figure 5:
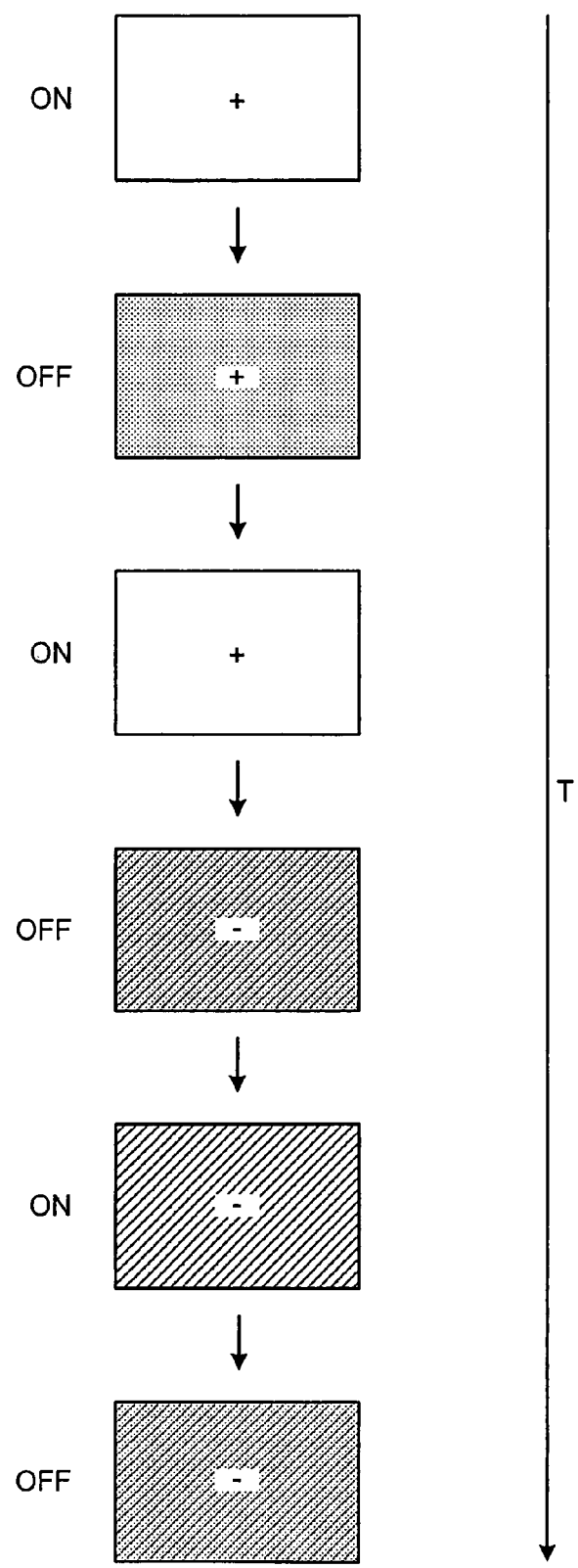
FIG. 5 is a schematic diagram of a case where one-image writing period is ½ of a polarity-reversing period.

FIG. 5 is a schematic diagram of a case where the one-image writing period is set to 1/120 second which corresponds to 1/2 of the polarity-reversing period T. In this case, the polarity is reversed not during the one-image writing period. Instead, the polarity is reversed every time the one-image writing is finished. Similarly to the case shown in FIG. 3, the LEDs 11R, 11G, and 11B are turned ON and OFF three times during the polarity-reversing period T. When the images displayed in the ON-time of the LEDs 11R, 11G, and 11B are integrated, the brightness of the entire resulting image is biased to the brightness corresponding to the positive polarity. In this case, dissimilar to the case shown in FIG. 4, there is no non-uniformity in the displayed image. However, the viewer can recognize the gradation shift. When the displayed images has non-uniformity or gradation shift due to the manner of control of the LEDs 11R, 11G, and 11B, high-quality image display cannot be achieved even if the image can be displayed in a wide dynamic range.

The projector 10 according to the embodiment of the invention sets a fundamental frequency of PWM based on the polarity-reversing frequency so that a time period the LEDs 11R, 11G, and 11B are turned ON by the positive polarity is equal to a time period the LEDs 11R, 11G, and 11B are turned ON by the negative polarity. When the fundamental frequency of PWM for the LEDs 11R, 11G, and 11B is represented as fp, the polarity-reversing frequency for the spatial light modulators 13R, 13G, and 13B is represented as fr, and an arbitrary positive integer is represented as n, at least one of following expressions (1) and (2) is satisfied:

$$fp = 2 \times n \times fr \quad (1),$$

$$fp = (n+1/2) \times fr \quad (2).$$

The expression (1) indicates that the fundamental frequency fp of PWM is an even multiple of the polarity-reversing frequency fr for the spatial light modulators 13R, 13G, and 13B. The expression (2) indicates that the phase of PWM is reversed every polarity-reversing period.

Figure 6:
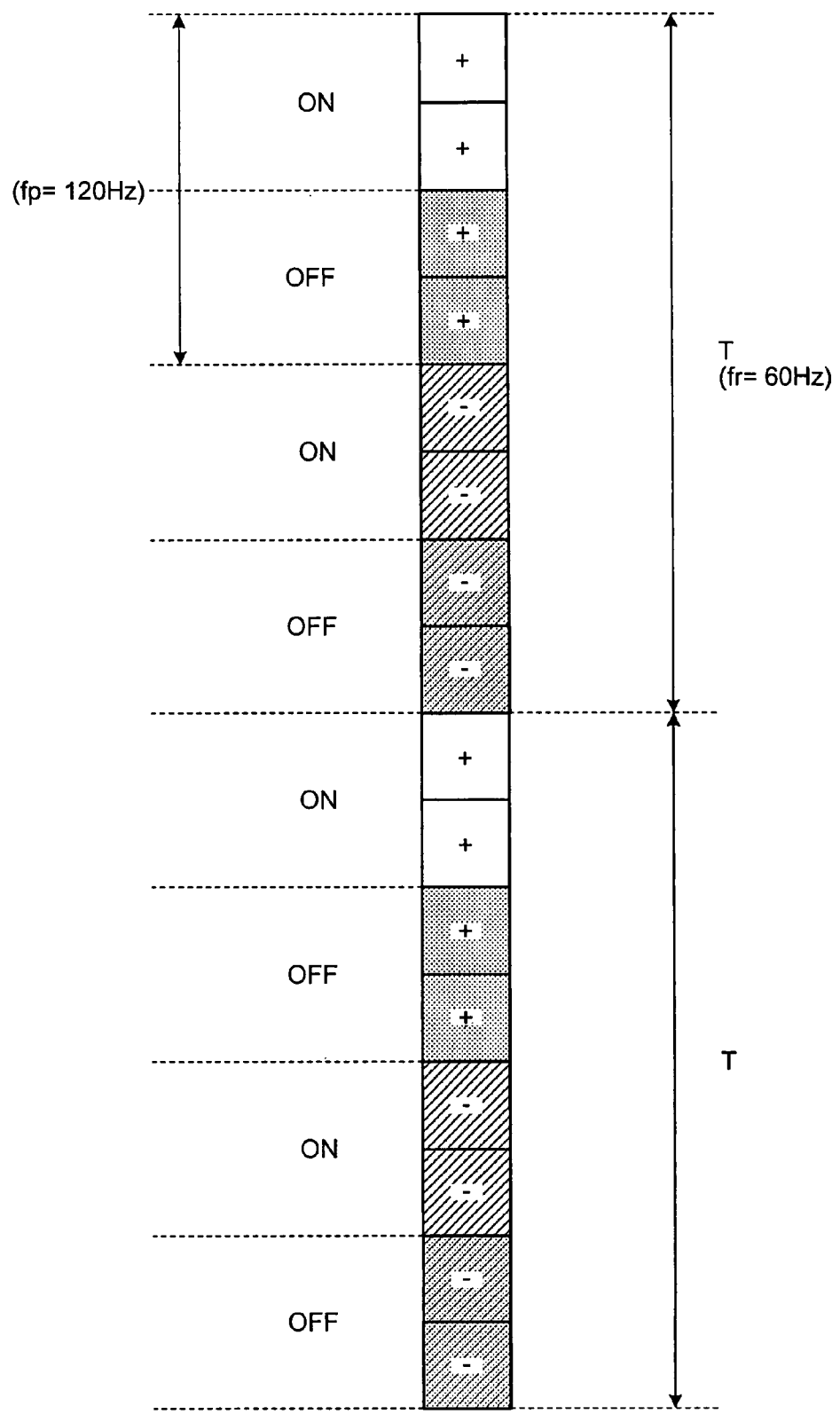
FIG. 6 is a schematic diagram of a relation between polarity reversal and driving of LED in the embodiment of the invention.
Figure 7:
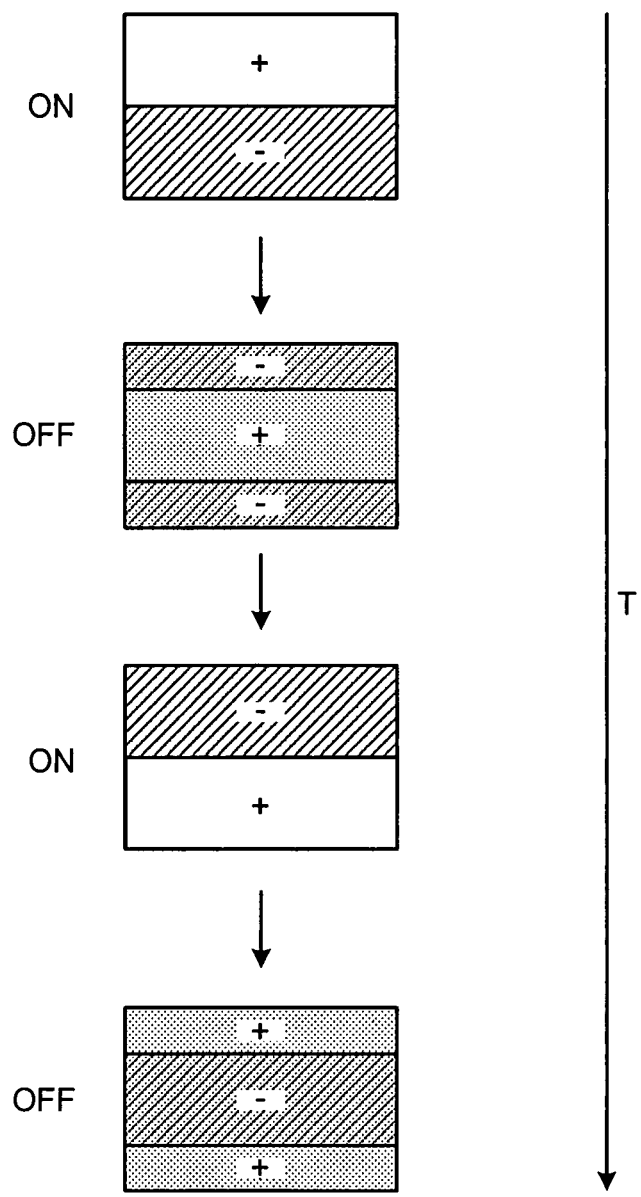
FIG. 7 is a schematic diagram of ON-time corresponding to positive polarity and ON-time corresponding to negative polarity.

FIG. 6 is a schematic diagram illustrating a relation between the reversing of the polarity and the driving of the LEDs 11R, 11G, and 11B according to the embodiment of the invention. Here, the polarity-reversing frequency fr is set to 60 Hz. In the case of FIG. 6, the fundamental frequency fp of PWM whose period consists of one ON-period and one OFF-period is set to 120 Hz. Therefore, the fundamental frequency fp is twice the polarity-reversing frequency fr, whereby the expression (1) is satisfied (n=1). In this case, the ON-time corresponding to the positive polarity and the ON-time corresponding to the negative polarity are equal within the polarity-reversing period T, as shown in FIG. 7. Since the persistent images of both the image corresponding to the positive polarity and the image corresponding to the negative polarity are integrated without bias, the difference in brightness of the images corresponding to the positive polarity and the negative polarity can be offset with each other. The same effect as obtained when n=1 can be obtained when n=2 in the above expression (1). In FIG. 6, the ON-time and the OFF-time each occupy a half (50%) of a fundamental period, i.e., 1/fp second, of the PWM. However, the same effect as mentioned above, i.e., offsetting of the brightness difference, can be obtained when the ON-time and the OFF-time are determined as appropriate so as to occupy other fractions of the period.

Figure 8:
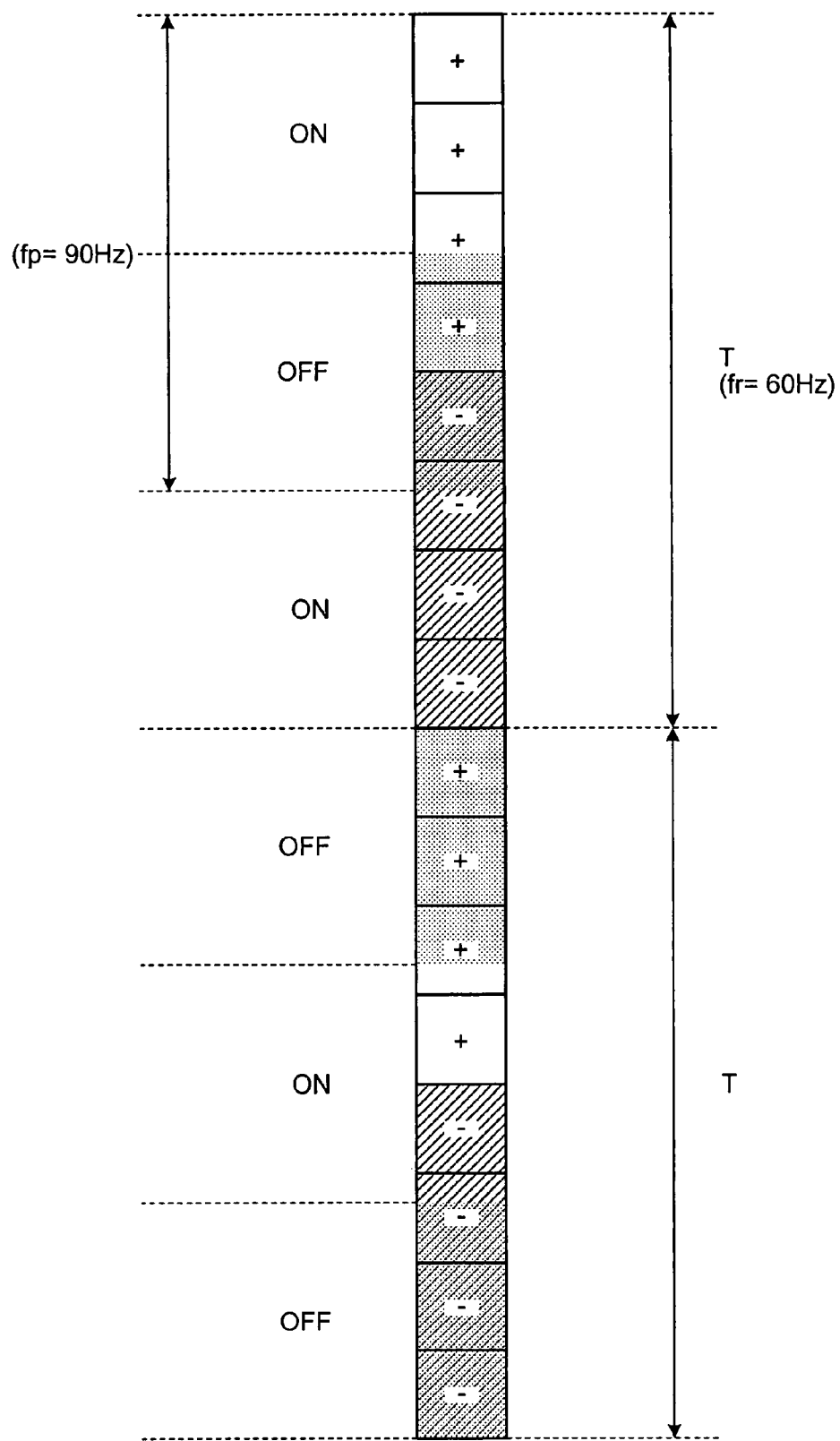
FIG. 8 is a schematic diagram of another example of fundamental frequency setting.
Figure 9:
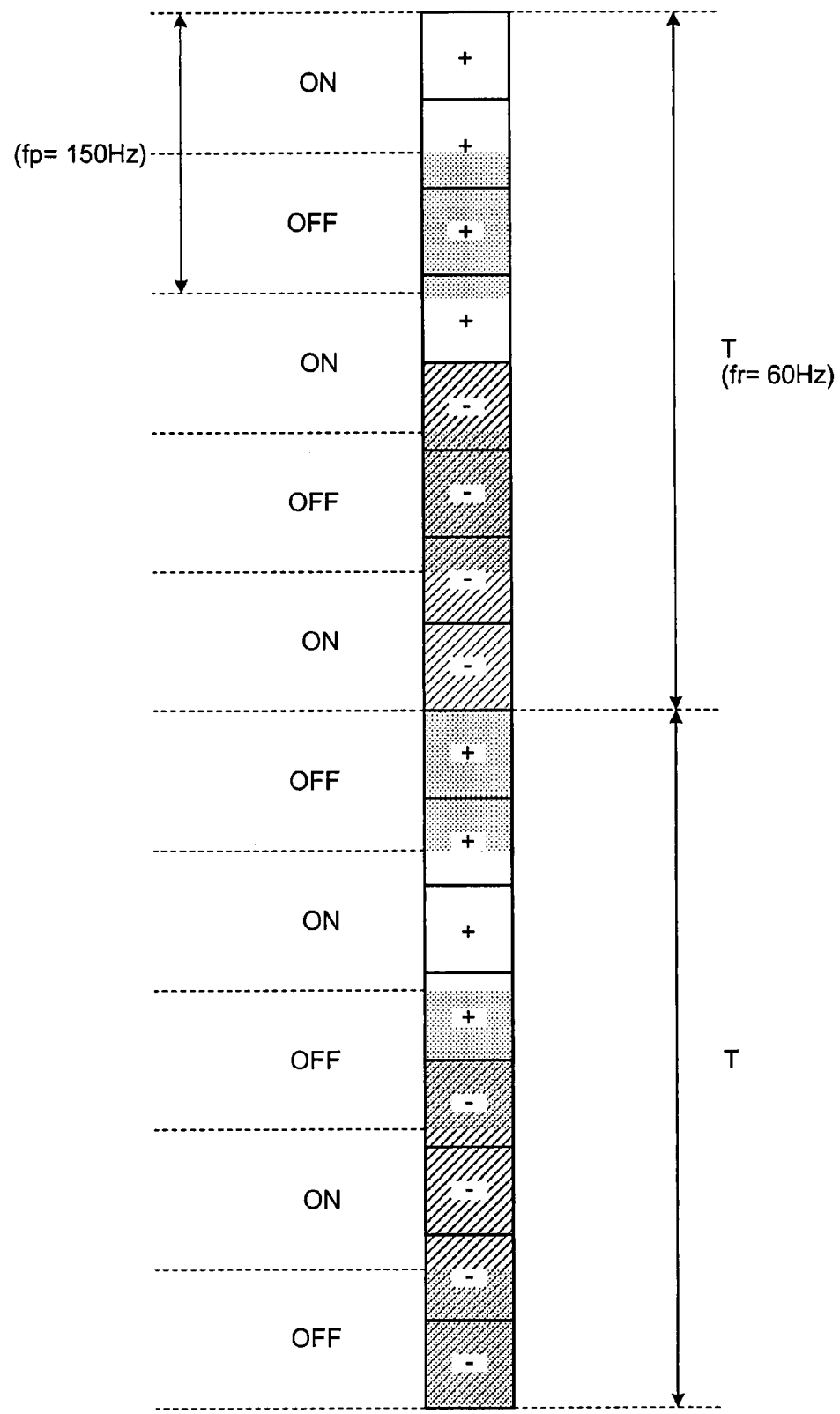
FIG. 9 is a schematic diagram of still another example of fundamental frequency setting.

FIGS. 8 and 9 are schematic diagrams illustrating cases where the fundamental frequency fp is set to a different value. In the case shown in FIG. 8, the fundamental frequency fp is 90 Hz, whereby the expression (2) is satisfied (n=1). When the phase of PWM changes from ON, OFF, to ON during one polarity-reversing period T, in the next period T, the phase changes from OFF, ON, to OFF. Further, in the subsequent period T, the phase changes from ON, OFF, to ON, thereby returning to the original phase. In this case, the length of the ON-time corresponding to the positive polarity becomes equal to the length of the ON-time corresponding to the negative polarity within two polarity-reversing periods (T×2). Thus, since the images corresponding to the positive polarity and the negative polarity are integrated as persistent images without bias, the brightness difference between the images corresponding to the positive polarity and the negative polarity can be offset.

In the case of FIG. 9, the fundamental frequency fp is 150 Hz, whereby the expression (2) is satisfied (n=2). When the phase of PWM changes from ON, OFF, ON, OFF, to ON in one polarity-reversing period T, in the next period T, the phase changes from OFF, ON, OFF, ON, to OFF. Further in the next period T, the phase of PWM returns to the original phases, i.e., ON, OFF, ON, OFF, to ON. In this case, the length of the ON-time corresponding to the positive polarity becomes equal to the length of the ON-time corresponding to the negative polarity within two polarity-reversing periods (T×2). Therefore, the brightness difference in images corresponding to the positive polarity and the negative polarity can be offset with each other. Thus, the same effect as obtained when n=1 or 2 can be obtained when n is equal to or larger than 3 in the expression (2).

Figure 10:
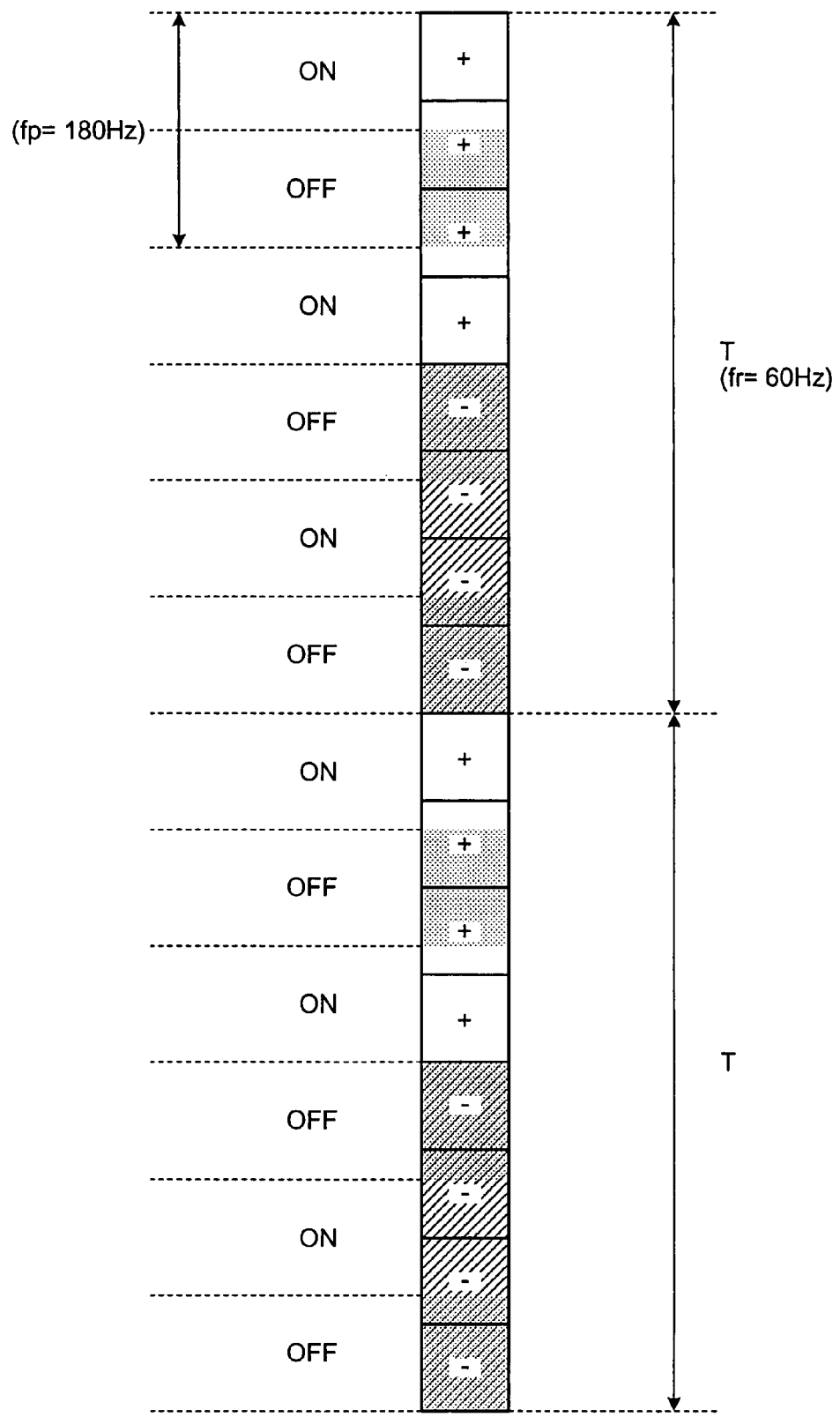
FIG. 10 is a schematic diagram of a comparative example of the embodiment.

FIG. 10 is a schematic diagram of a comparative example for the embodiment where neither the expression (1) nor the expression (2) is satisfied. In the example shown in FIG. 10, the fundamental frequency fp is set to 180 Hz. When fp=180 Hz, the expressions (1) and (2) are not satisfied. In order to make the viewer recognize the image in the average brightness obtained by integration of the image corresponding to the positive polarity and the image corresponding to the negative polarity, it is desirable that the difference in brightness be offset within approximately two polarity-reversing periods. In the case shown in FIG. 10, the time the image is displayed in the positive polarity exceeds the time the image is displayed in the negative polarity in two polarity-reversing periods (T×2). Therefore, the viewer ends up recognizing the image in brightness biased to the brightness corresponding to the positive polarity.

As can be seen from the foregoing, the satisfaction of at least one of the expressions (1) and (2) means offsetting of the brightness difference of the images corresponding to the positive polarity and the negative polarity within at least two polarity-reversing periods. Offsetting of the difference in brightness of the images allows for display of high-quality images where gradation shift and non-uniformity are reduced. Thus, the high-quality images can be displayed with a wide dynamic range. In consideration of the influence of noises to the control signals, the integer n in the expressions (1) and (2) is desirably a number equal to or larger than five. For example, n can be approximately 100. Though FIGS. 6 to 9 illustrate the examples where the polarity is reversed within the one-image writing period, the polarity may be reversed every time the one-image writing is finished, rather than within the one-image writing period.

Figure 11:
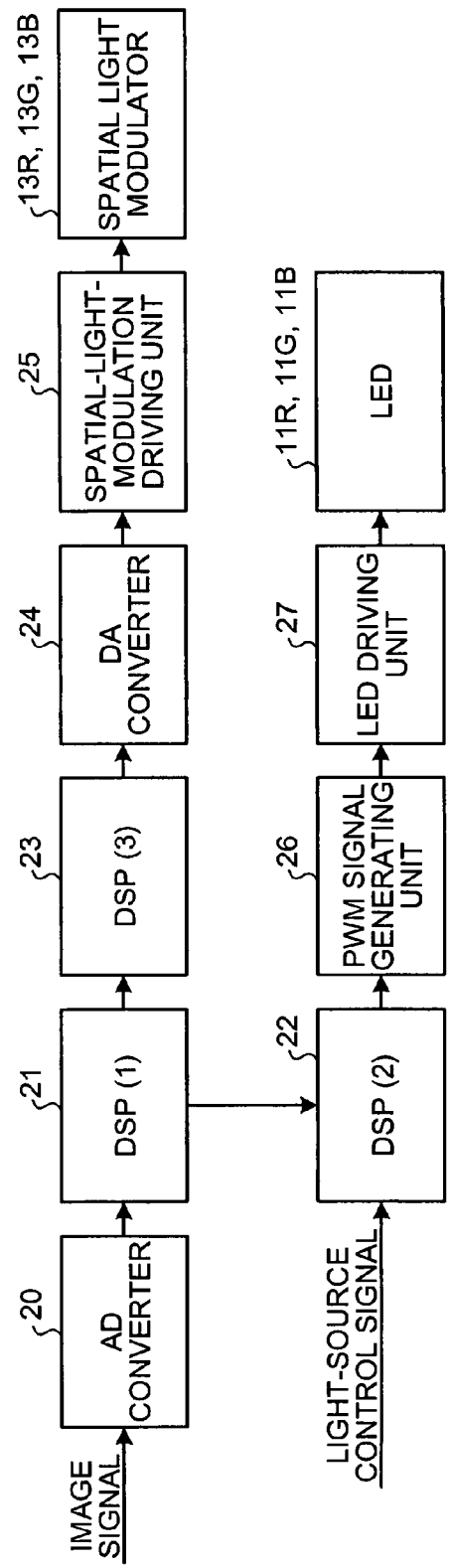
FIG. 11 is a block diagram of a structure of elements for driving the projector.

FIG. 11 is a block diagram of elements for driving the projector 10. An AD converter 20 converts an image signal, which is supplied from external equipment and the like in an analog form, into a digital signal. A DSP(1) 21 which is a digital signal processing circuit extracts a brightness parameter from the image signal converted into a digital form for controlling the brightness of the image. A DSP(2) 22 which is a digital signal processing circuit converts the brightness parameter extracted by the DSP(1) 21 into a duty cycle of PWM. A Look Up Table (LUT) can be employed for the conversion of the brightness parameter into the duty cycle.

The DSP(2) 22 also performs conversion of the duty cycle according to a light-source control signal directly supplied to the DSP(2) 22 from outside. The light-source control signal directly supplied to the DSP(2) 22 is previously set according to output difference of respective LEDs 11R, 11G, and 11B. For example, if the ON-time of the R-light LED 11R is to be adjusted to be 80% in maximum, the DSP(2) 22 performs an operation to multiply the output of the LUT by 80%. When the intensity of light supplied from each of the LEDs 11R, 11G, and 11B is adjusted, a preferable white balance can be achieved. When plural LEDs are employed for each color of light, the light-source control signal can be employed to control the LEDs for the same color according to their difference in output.

A PWM signal generating unit 26 generates a PWM signal by modulating a pulse width based on the output from the DSP(2) 22. Fundamental frequency of the PWM signal generated by the PWM signal generating unit 26 is determined according to the polarity-reversing frequency. An LED driving unit 27 drives the LEDs 11R, 11G, and 11B according to the PWM signal supplied from the PWM signal generating unit 26. The LEDs 11R, 11G, and 11B supply the light modulated according to the PWM signal. Thus, the LEDs 11R, 11G, and 11B are controlled based on the image signal and the light-source control signal.

A DSP(3) 23 which is a digital signal processing circuit expands the gradation range of image signals based on the brightness parameter extracted by the DSP(1) 21. The expansion of the gradation range allows for display of high-contrast images which makes the best of the dynamic range of the spatial light modulators 13R, 13G, and 13B. After the image signal is subjected to the expansion processing in the DSP(3) 23, an DA converter 24 converts the expanded image signal into an analog form. A spatial-light-modulation driving unit 25 drives the spatial light modulators 13R, 13G, and 13B according to the image signal converted into an analog form. The spatial light modulators 13R, 13G, and 13B modulate the light emitted from the LEDs 11R, 11G, and 11B, respectively, according to the image signal. The structure of the projector 10 is not limited to a structure which adjusts the light intensity based on the brightness parameter of the image signal and the light-source control signal. The projector 10 may be configured so as to adjust the light intensity based on one of the brightness parameter and the light-source control signal.

Figure 12:
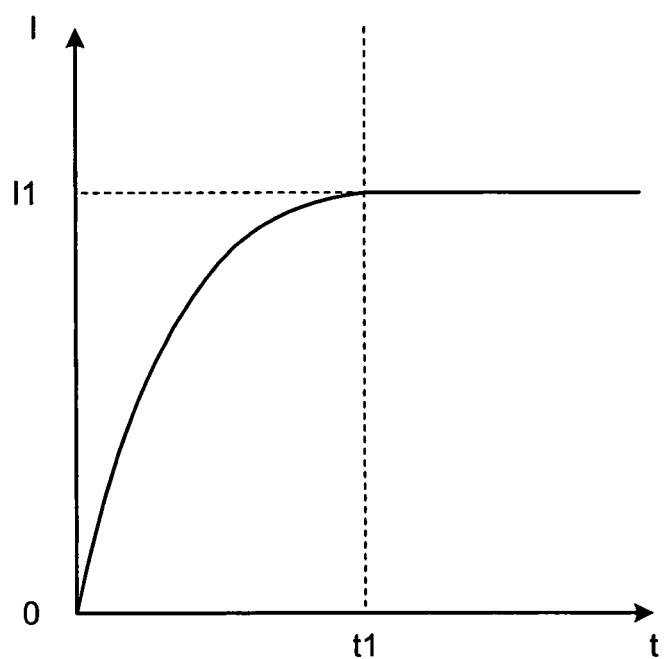
FIG. 12 is a schematic diagram illustrating a response characteristic of a liquid crystal.

FIG. 12 is a graph of a response characteristic of liquid crystals in the liquid crystal display. Specifically, FIG. 12 shows a relation between time t elapsed since the start of voltage application and intensity I of light transmitted through the liquid crystal layer. The liquid crystal completes its orientational change in response to the applied voltage when a predetermined time $t_1$ elapses since the start of voltage application, and transmits the light of intensity $I_1$ corresponding to the applied voltage. Before the predetermined time $t_1$ elapses from the start of voltage application, the intensity I of transmitted light is different from the intensity $I_1$ corresponding to the applied voltage, since the liquid crystal has not completed its change into an oriented state corresponding to the applied voltage. Thus, the liquid crystal display needs a response time after receiving the signal until giving a response.

Figure 13:
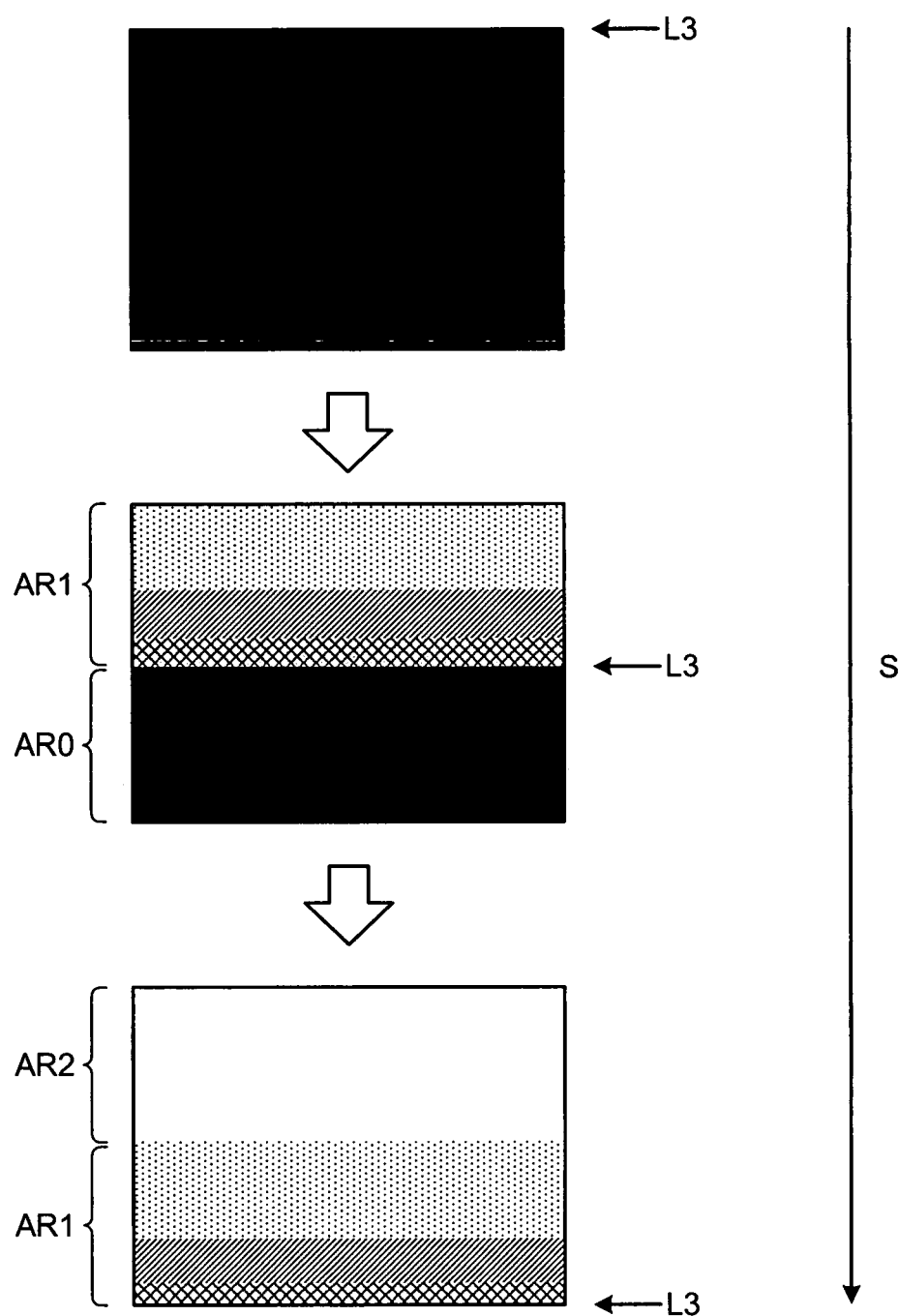
FIG. 13 is a schematic diagram illustrating non-uniformity of brightness attributable to the response characteristic of a liquid crystal.

FIG. 13 is a schematic diagram illustrating non-uniformity of brightness attributable to the response characteristic of the liquid crystal. For example, assume that the entire screen is switched from black to white during one-image writing period. The one-image writing period is a scanning period during which one writing is performed on all scanning electrodes. Writing position L3 for displaying white scans all scanning electrodes sequentially during a scanning period S. Since the sequential scanning of the writing position L3 is performed on the liquid crystal display all of whose pixels display black, an area AR0 where the writing position L3 has not passed remains in black. On the other hand, an area AR2 where the response time of the liquid crystal has passed since the passage of the writing position L3 is completely in white. In an area AR1 where the response time of the liquid crystal has not passed since the passage of the writing position L3, the switching from black to white is not complete. Therefore, in the area AR1, gradation appears in such a manner that the black color gradually changes to the white color according to the distance from the writing position L3.

Figure 14:
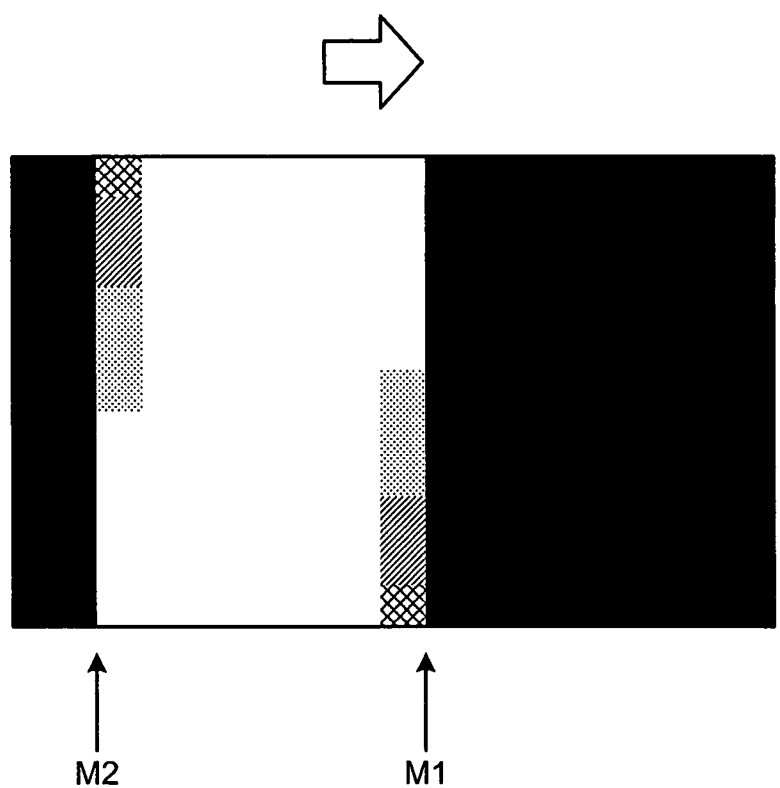
FIG. 14 is a schematic diagram illustrating non-uniformity of brightness in a moving picture.

When the entire screen is left in white after the switching from black to white, the screen comes to a stable state displaying white, whereby instantaneous cancellation of the gradation is possible. Therefore, in the static image display, the viewer hardly recognizes the non-uniformity of brightness attributable to the response characteristic of the liquid crystal. On the contrary, in moving picture display, where an image of a different brightness from the brightness of background moves in the screen, for example, the viewer sometimes notices the non-uniformity of brightness caused by the response characteristic of the liquid crystal. For example, when a white image moves in a direction of arrow against the black background as shown in FIG. 14, non-uniformity of brightness sometimes becomes visible in an area around a boundary M1 where black is being switched to white and an area around a boundary M2 where white is being switched to black.

When the LEDs 11R, 11G, and 11B are left ON constantly, the display comes to a stable state displaying white or black immediately after the passage of the boundaries M1 or M2. Therefore, it is possible to make gradation difficult to recognize. However, when the ON/OFF switching of the LEDs 11R, 11G, and 11B is performed by PWM, an area where the response of the liquid crystals is not completed sometimes appears as if highlighted, so as to make gradation easily noticed. For example, when the boundary M1 passes a pixel, the color is changed from black to white similarly to the case shown in FIG. 13. If the PWM continues so that the phase is OFF in the first half of the one-image writing period and ON in the latter half, a similar gradation as shown in FIG. 13 comes to be highlighted.

Further, at a pixel where the boundary M2 passes, the color is changed from white to black, contrarily to the case of FIG. 13. In this case, though the area where the response time of liquid crystal has passed after the writing position passes exhibits black, an area close to the writing position remains in white. Therefore, if PWM continues so that the former half is OFF and the latter half is ON in the one-image writing period, gradation which is vertically reversed from the gradation shown in FIG. 13 comes to be highlighted. The non-uniformity of brightness appearing as gradation can disturb image viewing.

Figure 15:
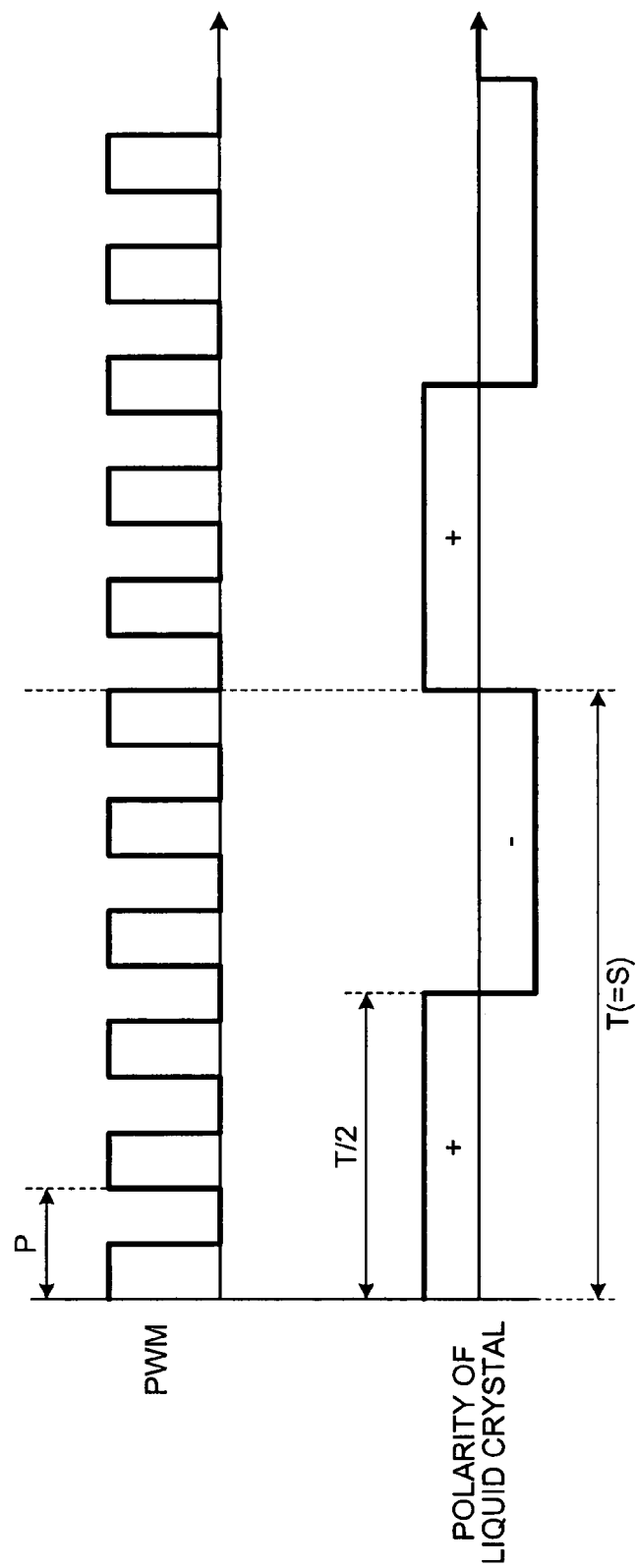
FIG. 15 is a schematic diagram of a control operation for reducing the non-uniformity of brightness.

FIG. 15 is a timing chart of a control operation for alleviating the non-uniformity of brightness attributable to the response characteristic of the liquid crystal. In the case shown in FIG. 15, the fundamental frequency fp of PWM is 330 Hz, which satisfies the expression (2) (n=5). The pulse width of the PWM is determined based on a fundamental period P (=$\frac{1}{330}$ second) as a maximum pulse width. The polarity-reversing period T is $\frac{1}{60}$ second. When a scanning frequency for writing of all scanning electrodes is represented as fs, a following expression (3) is satisfied:

$$fp=(n+1/2) \times fs \qquad (3).$$

The expression (3) indicates that the phase of the PWM is reversed whenever the image signal writing corresponding to one image is performed on the entire screen. In the example shown in FIG. 15, the scanning period S for performing the writing once for all the scanning electrodes is set to $\frac{1}{60}$ second, which is the same as the polarity-reversing period T. The scanning frequency fs is 60 Hz, which is the same as the polarity-reversing frequency fr, whereby the expression (3) is satisfied (n=5).

When the phase of the PWM is reversed every scanning period S, the image with the gradation and the image in white are integrated in an area near the boundary M1 shown in FIG. 14, for example. Though some blurring may occur due to integration of the image with gradation and the image in white, unnatural gradation obstructing a comfortable image viewing can be reduced. Similarly, in an area around the boundary M2, the image with gradation and the image in black may be integrated so that the gradation becomes less noticeable. Thus, the non-uniformity in brightness particularly in the moving picture can be reduced.

When both the polarity-reversing frequency fr and the scanning frequency fs are 60 Hz, the fundamental frequency fp which satisfies the expressions (2) and (3) are: 90 Hz, 150 Hz, ..., and [(n+1/2)×60]Hz. When the polarity-reversing frequency fr and the scanning frequency fs are set to the same value, it is possible to determine the fundamental frequency fp in such a manner that the non-uniformity of display caused by reversing the polarity and non-uniformity of brightness attributable to the response characteristic of liquid crystals can be reduced simultaneously.

Figure 16:
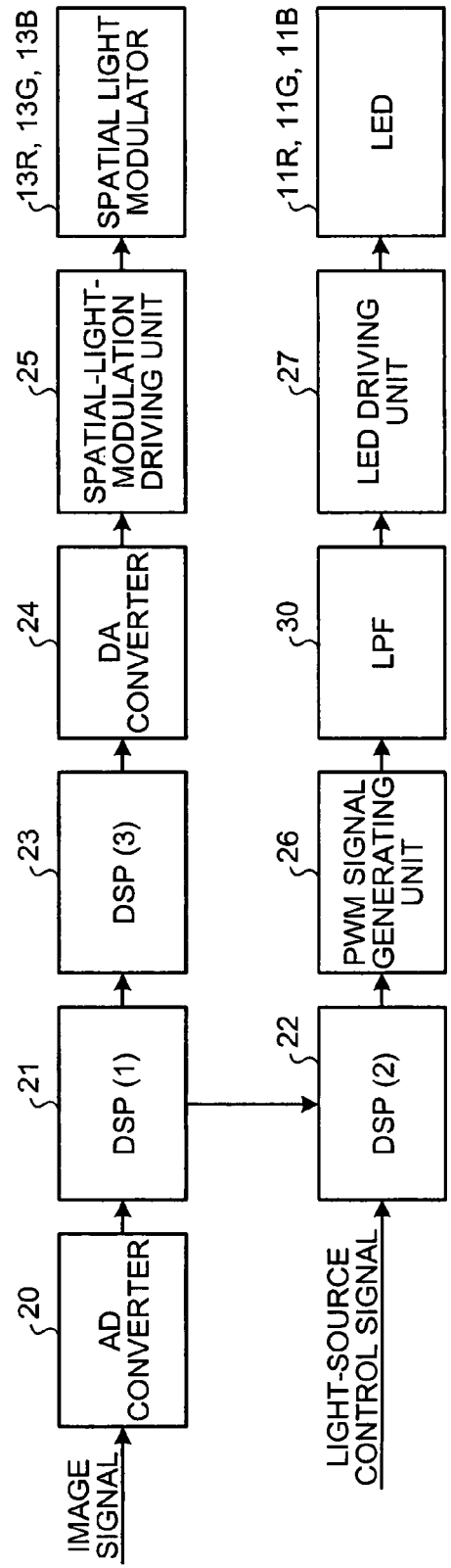
FIG. 16 is a block diagram of a modification of the structure of elements for driving the projector.

FIG. 16 is a block diagram of a modification of the structure for driving the projector 10. The modification is characterized in that it includes a low-pass filter (LPF) 30. The LPF 30 generates a smoothed signal by smoothing a PWM signal supplied from the PWM signal generating unit 26, and supplies the smoothed signal to the LED driving unit 27. The LEDs 11R, 11G, and 11B supply light corresponding to the smoothed signal supplied from the LPF 30. The LPF 30 can be implemented as an RC circuit or the like. The LPF 30 may be embedded into the PWM signal generating unit 26 or the LED driving unit 27.

Figure 17:
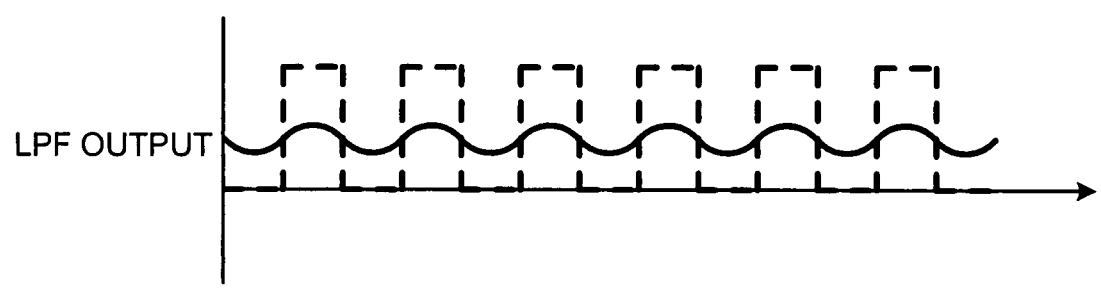
FIG. 17 is a schematic diagram of a smoothed signal supplied from an LPF.

FIG. 17 is a graph of a smoothed signal supplied from the LPF 30. The LPF 30 smoothes the signal by cutting peak portions, i.e., portions over a reference value, from the PWM signal indicated by a dotted line and supplementing bottom portions. If phase shift occurs in the PWM signal relative to the clock, an influence of the phase shift becomes noticeable as the difference in brightness between the image of positive polarity and the image of negative polarity increases. The use of the LPF 30 in the smoothing of the PWM signal realizes precise correspondence between the driving of the spatial light modulators 13R, 13G, and 13B, and the driving of the LEDs 11R, 11G, and 11B, thereby enhancing the robustness against the phase shift of the PWM signals.

The projector 10 is not limited to those employing the transmissive liquid crystal display as the spatial light modulator. The projector 10 may employ a reflective liquid crystal display. The projector 10 is not limited to a front projector. The projector 10 may be a rear projector which supplies light to one surface of a screen so that the viewer views light passing through the screen and emitted from the other surface of the screen as an image. Further, the invention is applicable to a direct-vision display using a liquid crystal display.

According to the embodiments, the fundamental frequency of PWM can be set based on the polarity-reversing frequency in such a manner that a time the light source unit is turned on by the positive polarity is equal to a time the light source unit is turned on by the negative polarity. Since the image corresponding to the positive polarity and the image corresponding to the negative polarity are integrated as persistent images without bias, the difference in brightness between the images corresponding to the positive polarity and the negative polarity can be offset. Offsetting of the difference in brightness of the images allows for a display of high-quality images in which the gradation shift and the non-uniformity of display are reduced. Thus, a projector can display high-quality images in a wide dynamic range.

In the embodiments, the fundamental frequency is an even multiple of the polarity-reversing frequency, or a phase of the pulse width modulation is reversed every polarity-reversing period according to the polarity-reversing frequency. Further, the difference in brightness is offset within approximately two polarity-reversing periods in order to make the viewer recognize the image in average brightness obtained through integration of the image corresponding to the positive polarity and the image corresponding to the negative polarity. When the fundamental frequency of PWM is an even multiple of the polarity-reversing frequency, the difference in brightness can be offset within one polarity-reversing period. When the phase of PWM is reversed every polarity-reversing period, the difference in brightness can be offset within two polarity-reversing periods. Thus, the difference in brightness between the images corresponding to the negative polarity and the positive polarity can be offset.

Further, in the embodiments, the phase of the pulse width modulation may be reversed every time the writing of the image signal is performed once for the entire screen. The liquid crystal display requires a certain response time after the signal writing until the liquid crystal molecules are turned into a state corresponding to the applied voltage. When the light source unit is turned on or turned off during one-image writing, the time elapsed since the signal writing may be different for each liquid crystal molecule depending on the time the light source unit is turned on and off, sometimes resulting in non-uniformity of brightness in the displayed image. When the phase of PWM is reversed every time the one-image writing is finished, a portion where the response of liquid crystals is not complete can be made less noticeable. Thus, non-uniformity in brightness particularly in a moving picture can be reduced.

Further, in the embodiments, the light source unit supplies the light according to the smoothed signal which is obtained by smoothing the pulse width modulation (PWM) signal. Then, even if the phase shift occurs in the PWM signal, influence thereof can be reduced and a precise display can be achieved.

In the embodiments, there are plural light source units and the light source units are controlled according to difference in outputs thereof. Therefore, the control can be achieved corresponding to the difference in outputs of the light source units. Further, when the adjustment is performed based on the difference in outputs of the light source units corresponding to each color, a preferable white balance can be achieved.

In the embodiments, the solid-state light source which can be turned on and off at high speed is employed. Therefore, it is possible to supply the light modulated by PWM correctly.

In the embodiments, the liquid crystal display is employed as the spatial light modulator. When the spatial light modulator is a liquid crystal display, the light modulation can be performed in accordance with the image signals. The liquid crystal display is driven by an applied voltage whose polarity is reversed according to a predetermined polarity-reversing frequency. Thus, in a structure including the liquid crystal display, the gradation shift and the non-uniformity of display attributable to the polarity-reversed driving can be reduced, whereby a high-quality image can be displayed in a wide dynamic range.

As can be seen from the foregoing, the projector according to the invention is suitable for the use with a solid-state light source and a liquid crystal display.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projector comprising:
   a light source unit that supplies light;
   a spatial light modulator that modulates light supplied from the light source unit according to an image signal, wherein:
   the spatial light modulator includes a liquid crystal display that is driven by an applied voltage whose polarity is reversed according to a polarity-reversing frequency which is specific to the spatial light modulator, a brightness of an image is different when a polarity of the applied voltage is positive and when a polarity of the applied voltage is negative, and
   the light source unit supplies light which is modulated according to pulse width modulation for which fundamental frequency is set based on the polarity-reversing frequency such that a difference in brightness between images corresponding to the positive polarity and the negative polarity is offset; and
   a controller that controls the light source unit to supply light that satisfies at least one condition that (A) the fundamental frequency is an even multiple of the polarity-reversing frequency, and (B) a phase of the pulse width modulation is reversed every polarity-reversing period according to the polarity-reversing frequency,
   wherein when the controller controls the light source unit to supply light that satisfies the condition that the phase of the pulse width modulation is reversed every polarity-reversing period according to the polarity-reversing frequency, the phase of the pulse width modulation is reversed every time one writing of the image signal is performed for an entire screen.

2. The projector according to claim 1, further comprising a low-pass filter that smoothes a pulse width modulation signal supplied to the light source unit, wherein
   the light source unit supplies light according to a smoothed signal which is obtained by smoothing the pulse width modulation signal.

3. The projector according to claim 1, further comprising a digital signal processing circuit that performs conversion of a duty cycle of a pulse width modulation signal supplied to the light source unit, wherein
   there are plural light source units, and
   the light source units are controlled by the digital signal processing circuit according to difference in outputs of the light source units.

4. The projector according to claim 1, wherein
   the light source unit includes a solid-state light source.

5. The projector according to claim 1, wherein the image signal is applied continuously to the spatial light modulator.

6. The projector according to claim 1, wherein a difference in brightness between images corresponding to the positive polarity and the negative polarity occurs due to turning on/off the light during a period in which the image signal is applied to the spatial light modulator.

7. A projector comprising:
   a light source unit that supplies light;
   a spatial light modulator that modulates light supplied from the light source unit according to an image signal, wherein:
   the spatial light modulator includes a liquid crystal display that is driven by an applied voltage whose polarity is reversed according to a polarity-reversing frequency which is specific to the spatial light modulator, a brightness of an image is different when a polarity of the applied voltage is positive and when a polarity of the applied voltage is negative,
   the light source unit supplies light which is modulated according to pulse width modulation for which fundamental frequency is set based on the polarity-reversing frequency such that a difference in brightness between images corresponding to the positive polarity and the negative polarity is offset, and
   the image signal is applied continuously to the spatial light modulator; and
   a controller that controls the light source unit to supply light that satisfies a condition that a phase of the pulse width modulation is reversed every polarity-reversing period according to the polarity-reversing frequency, the phase of the pulse width modulation is reversed every time one writing of the image signal is performed for an entire screen.

8. The projector according to claim 7, further comprising a low-pass filter that smoothes a pulse width modulation signal supplied to the light source unit, wherein
   the light source unit supplies light according to a smoothed signal which is obtained by smoothing the pulse width modulation signal.

9. The projector according to claim 7, further comprising a digital signal processing circuit that performs conversion of a duty cycle of a pulse width modulation signal supplied to the light source unit, wherein
   there are plural light source units, and
   the light source units are controlled by the digital signal processing circuit according to difference in outputs of the light source units.

10. The projector according to claim 7, wherein
    the light source unit includes a solid-state light source.

11. A projector comprising:
    a light source unit that supplies light;
    a spatial light modulator that modulates light supplied from the light source unit according to an image signal, wherein:
    the spatial light modulator includes a liquid crystal display that is driven by an applied voltage whose polarity is reversed according to a polarity-reversing frequency which is specific to the spatial light modulator, a brightness of an image is different when a polarity of the applied voltage is positive and when a polarity of the applied voltage is negative,
    the light source unit supplies light which is modulated according to pulse width modulation for which fundamental frequency is set based on the polarity-reversing frequency such that a difference in brightness between images corresponding to the positive polarity and the negative polarity is offset, and
    a difference in brightness between images corresponding to the positive polarity and the negative polarity occurs due to turning on/off the light during a period in which the image signal is applied to the spatial light modulator; and
    a controller that controls the light source unit to supply light that satisfies a condition that a phase of the pulse width modulation is reversed every polarity-reversing period according to the polarity-reversing frequency, the phase of the pulse width modulation is reversed every time one writing of the image signal is performed for an entire screen.

12. The projector according to claim 11, further comprising a low-pass filter that smoothes a pulse width modulation signal supplied to the light source unit, wherein the light source unit supplies light according to a smoothed signal which is obtained by smoothing the pulse width modulation signal.

13. The projector according to claim 11, further comprising a digital signal processing circuit that performs conversion of a duty cycle of a pulse width modulation signal supplied to the light source unit, wherein
there are plural light source units, and
the light source units are controlled by the digital signal processing circuit according to difference in outputs of the light source units.

14. The projector according to claim 11, wherein the light source unit includes a solid-state light source.

* * * * *